United States Patent [19]

Grzanna et al.

[11] Patent Number: 4,693,767
[45] Date of Patent: Sep. 15, 1987

[54] CABLE SLEEVE WITH A DEVICE CROSS-SHAPED IN CROSS-SECTION FOR SUPPORT OF CABLE ENDS ENTERING THE CABLE SLEEVES

[75] Inventors: Ortwin Grzanna, Essen; Manfred Koesfeld, Wetter; Rolf-Udo Weber, Muelheim; Aloysius Steuer, Essen; Horst Romswinkel, Gelsenkirchen; Dieter Fremgen, Wuelfrath; Dieter Kastrop, Herdecke, all of Fed. Rep. of Germany

[73] Assignee: Walter Rose GmbH & Co. KG, Hagen, Fed. Rep. of Germany

[21] Appl. No.: 818,256

[22] Filed: Jan. 13, 1986

[30] Foreign Application Priority Data

Jan. 16, 1985 [DE] Fed. Rep. of Germany ....... 3501243
Jun. 14, 1985 [DE] Fed. Rep. of Germany ....... 3521366

[51] Int. Cl.$^4$ ...................... H01R 43/00; H02G 15/08
[52] U.S. Cl. ........................................ 156/49; 156/53; 156/55; 156/86; 174/77 R; 174/88 R; 174/DIG. 8; 403/273; 428/36
[58] Field of Search ...................... 174/77 R, 88 R, 93, 174/DIG. 8; 403/273; 428/36; 156/49, 53, 55, 86

[56] References Cited

U.S. PATENT DOCUMENTS

| | | | |
|---|---|---|---|
| 3,312,772 | 4/1967 | Sherlock | 174/77 R |
| 4,304,959 | 12/1981 | Vidakovits et al. | 174/DIG. 8 X |
| 4,341,921 | 7/1982 | Simpson | 174/DIG. 8 X |
| 4,458,104 | 7/1984 | Penneck et al. | 174/88 R |
| 4,466,846 | 8/1984 | Nolf et al. | 174/DIG. 8 X |
| 4,504,699 | 3/1985 | Dones et al. | 174/DIG. 8 X |
| 4,590,328 | 5/1986 | Kunze | 174/88 R |

FOREIGN PATENT DOCUMENTS

| | | |
|---|---|---|
| 120603 | 10/1984 | European Pat. Off. . |
| 1941166 | 2/1971 | Fed. Rep. of Germany ........ 174/93 |
| 2539275 | 3/1976 | Fed. Rep. of Germany . |
| 2758094 | 3/1979 | Fed. Rep. of Germany . |
| 3105471 | 9/1982 | Fed. Rep. of Germany . |
| 3127567 | 1/1983 | Fed. Rep. of Germany .... 174/77 R |
| 2284201 | 4/1976 | France . |
| 2508733 | 12/1982 | France .............................. 174/77 R |
| 371693 | 6/1939 | Italy .................................. 174/88 R |
| 1604986 | 12/1981 | United Kingdom . |

Primary Examiner—Morris H. Nimmo
Attorney, Agent, or Firm—Toren, McGeady & Associates

[57] ABSTRACT

A cable sleeve for covering a cable splice. An enveloping hose of heat shrinkable material is on its inside provided with a hot melt adhesive coating. A device designed cross-shaped in cross-section for support of the cable ends is inserted between the cables. The device is of hot melt adhesive whose fusion point is below that of the material of the hot melt adhesive coating.

9 Claims, 5 Drawing Figures

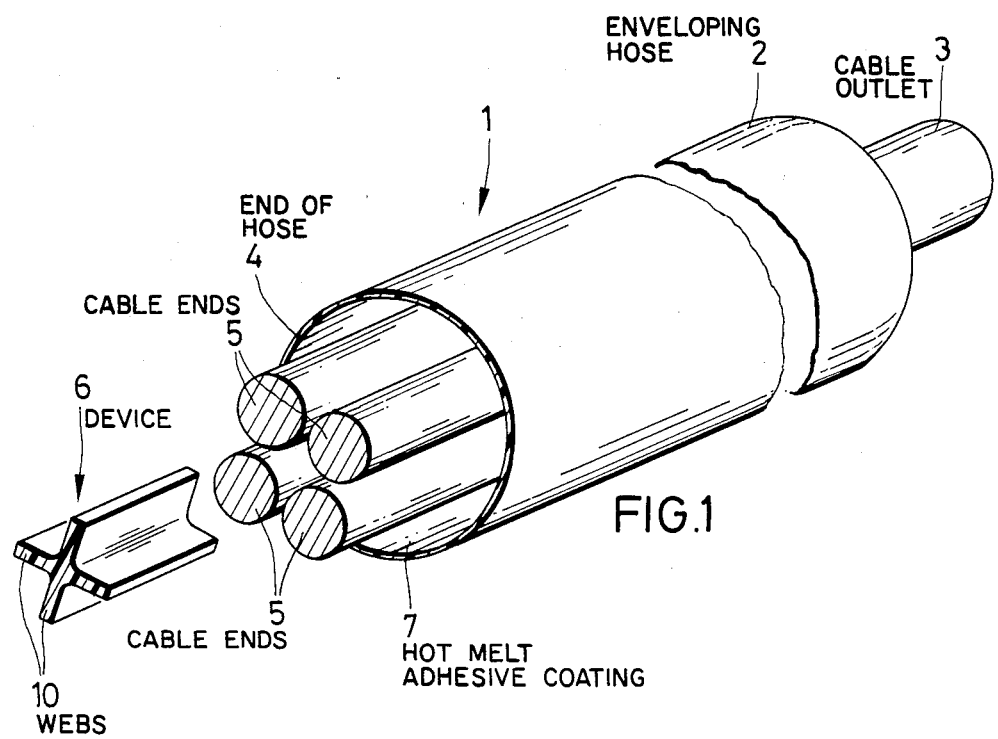
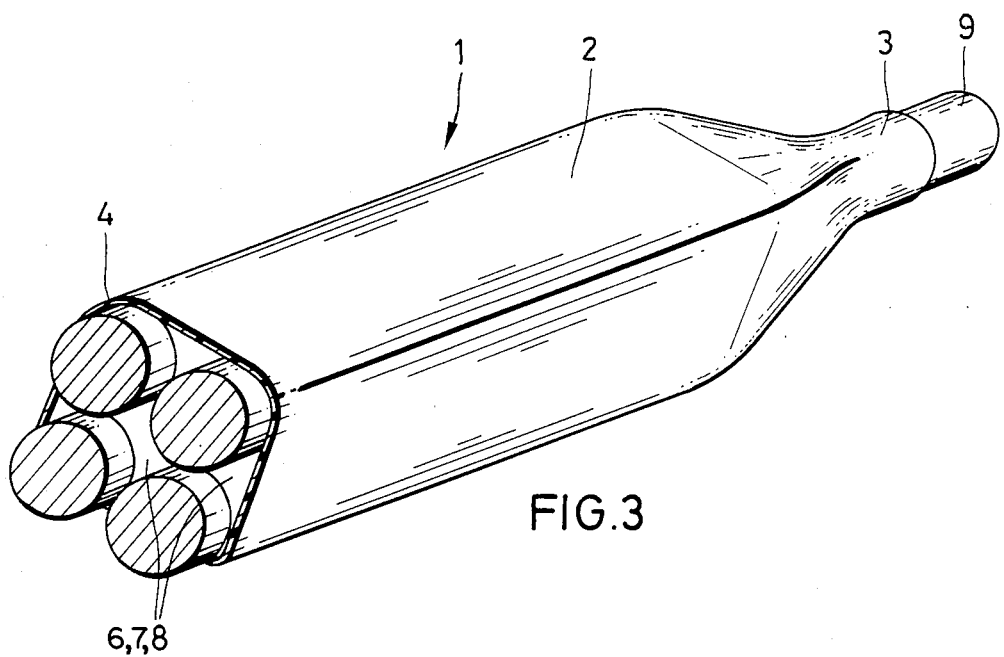

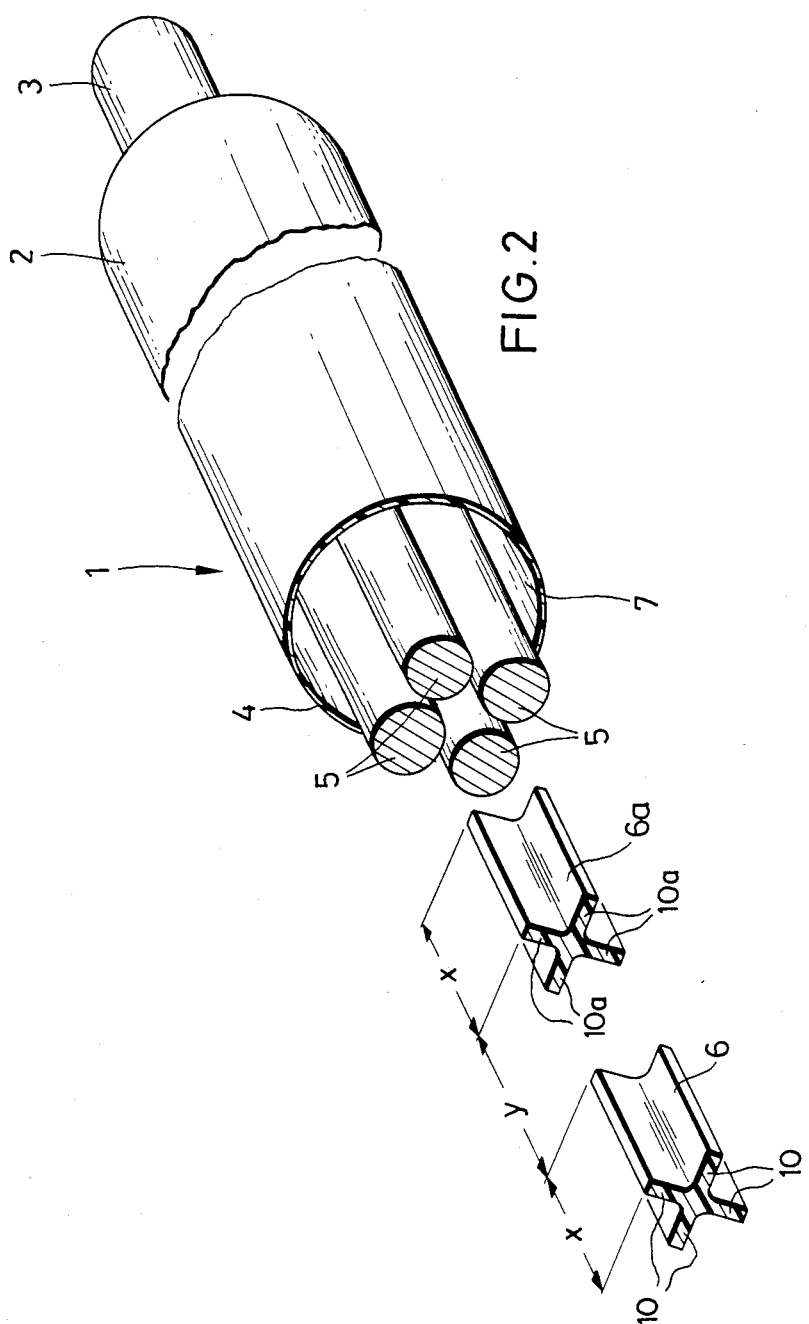

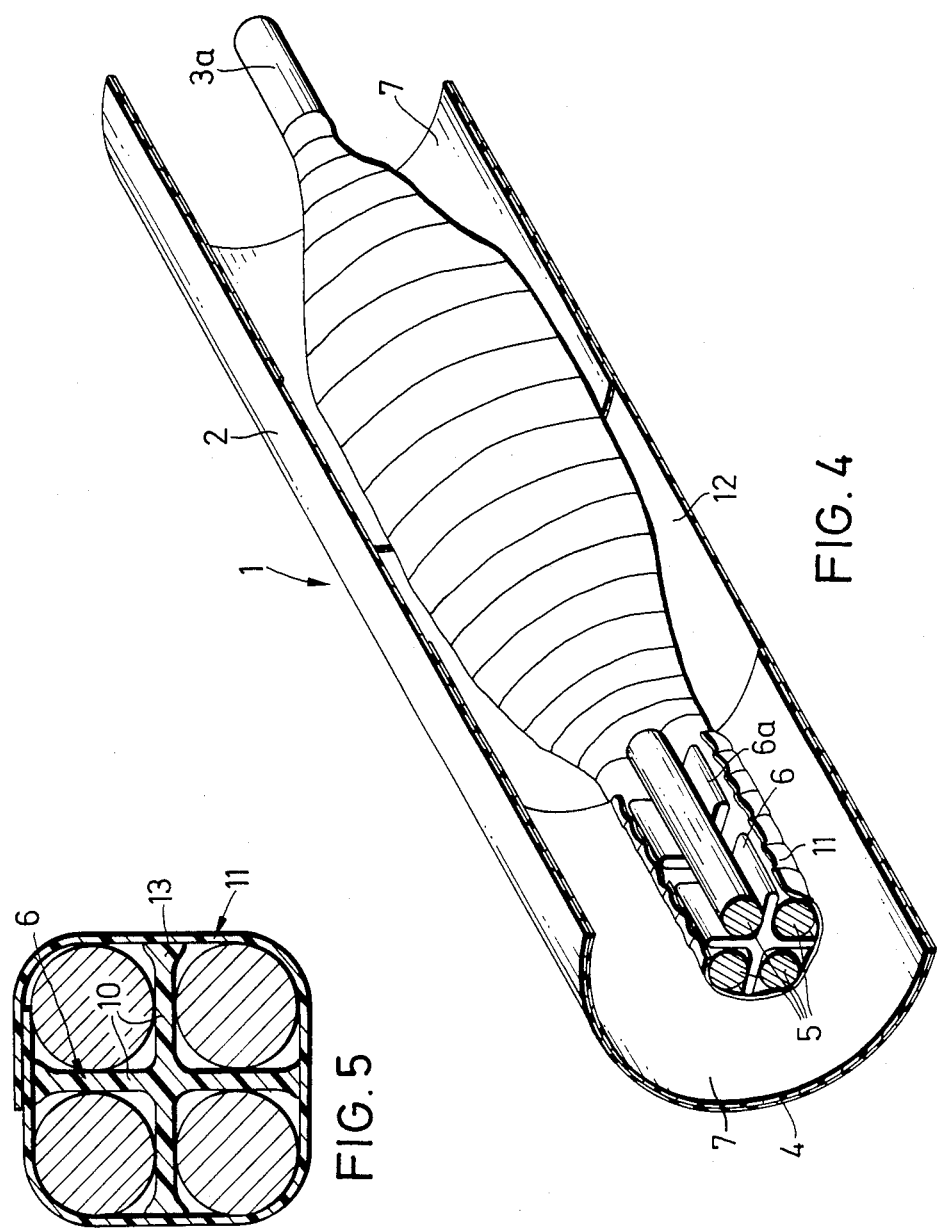

CABLE SLEEVE WITH A DEVICE CROSS-SHAPED IN CROSS-SECTION FOR SUPPORT OF CABLE ENDS ENTERING THE CABLE SLEEVES

BACKGROUND OF THE INVENTION

1. Field of the Invention

The invention is directed to a cable sleeve with an enveloping hose from a material shrinkable under the influence of heat, whose inner surface is at least partially provided with a hot melt adhesive coating and with a device designed cross-shaped in cross-section for support of cable ends entering the cable sleeve.

2. Description of the Prior Art

A device, as it is for instance known from the DE-OS 35 39 275, serves essentially for fixing entering cables of smaller cross-section than the cable sleeve itself in their position in the entry area and to retain same there after the cable sleeve envelope has been shrunk on. The known device acts as a space divider. The sleeve envelope has areas of hot melt adhesive applied in an annularly shaped manner, such an area being provided where the space divider is arranged inside of the cable sleeve.

It is disadvantageous in the known solution, that a multiplicity of fabrication steps is required. Thus the shrinking envelope must be provided with a hot melt adhesive coating in previously determined areas. The space divider must be separately fabricated. Thus assembly is particularly costly because the user must arrange the space divider accurately where later on a hot melt adhesive coating will be available.

It is a task of the invention to create a solution, with which such a device can be simplified, with which the handling is made more easy and with which particularly the assembly processes can be optimized.

In a device of the previously described type, this task is solved according to the invention in that the device is designed as a molded piece from hot melt adhesive. The hot melt adhesive may be a thermoplastic adhesive on the basis of polyamide. Such an adhesive is well known in the art.

Since the molded piece is made of hot melt adhesive, the installation position of this molded piece may be completely independent from the other design of the shrinking sleeve, i.e., the external envelope of a cable sleeve. It is completely irrelevant for the user, how and in which way the later envelope is coated with hot melt adhesive, since the device itself consists of this material and therefore satisfies all those requirements which are demanded of such coating.

The process of preparing the cable sleeve according to the invention includes the steps of inserting a cross-shaped device of hot melt adhesive between the entering cable ends, placing an enveloping hose over the cable ends and fixing the device in position by applying heat to the hose. The fusion point of the material of the device is lower than that of the inside coating of the hose. Further application of heat causes the device to melt so that the hollow spaces between the cables are filled out by the hot melt adhesive material. This sort of process is very simple for the user, it is free of malfunction and provides a high security of a later particularly good sealing of a cable sleeve designed in such a manner.

A development of the device according to the invention consists in that the fusion point of the hot melt adhesive of the device lies below that of the hot melt adhesive coating of the sleeve.

The difference in the fusion points of the two materials to be utilized has the advantage that, upon application of the heat in accordance with the above-mentioned process steps, the hot melt adhesive of the sleeve is at first prevented at exiting from the end faces by the device. Subsequently heat is applied so as to completely melt the device in the final state. This simplifies the assembly, without sacrificing the advantages inherent in the provision of the device on the edges of a cable sleeve.

By way of a further development, the invention provides that the cable sleeve exhibits at least another device inside it spaced to the respective device on the edge, whereby it is provided in particular, that the distance between the two devices is smaller than 1-times, and in particular smaller than 0.5-times the length of the device.

This layout can be provided particularly then, if the cavities between the inserted cables are comparatively large or geometrically different, which can occur particularly with cables of different diameter. For such a case the provision of at least two such devices spaced from each other can assure that at one spot of the cable sleeve sufficient hot melt adhesive is available in order to fill the cavities between the cable jackets, in order to in this way assure a completely sealed closure in the entry area.

In order to optimize the assembly, the invention provides that the cable ends are wound with a ribbon of hot melt adhesive prior to shrinking on of the envelope hose and after insertion of at least two, whereby the fusion point of the hot melt adhesive of the ribbon lies on the one hand below that of the adhesive coating of the envelope hose and on the other hand below that of the devices.

With this refinement of the invention it is achieved that the hot melt adhesive coating of the envelope hose can be less by that amount, which is made available by the wound-on ribbon in the area of the devices, meaning the already known normal coating with melt adhesive on the inside does not have to be increased even in the case of cable sleeves into which a plurality of cable ends is inserted either on one side or on both sides.

Furthermore, a development of the invention provides that a central area of the envelope hose is free of hot melt adhesive coating.

It has been found that if the envelope hoses are completely coated on the inside with hot melt adhesive, the hot melt adhesive which liquefies during the shrink-on process does not assure an accurate positional attachment of the shrink- or envelope hose, migrations can occur, which not only complicates the assembly, but also does not assure sealing with the ultimate safety.

By means of the inventive development the envelope- or shrink-on hose can first of all be shrunk onto the surface of the cable splice for fixing into position and seats itself tightly there while a hot melt adhesive is lacking, so that its position remains fixed also with additional subsequent application of heat.

In practical utilization cases with standard sleeves the distance between two molded parts can be held smaller than 10 mm. With this arrangement it is achieved that the melted pieces from hot melt adhesive must not be completely melted down during assembly. They can remain solid in the core areas by the dense structure in the inlet areas of the cable ends, without the danger arising thereby that leakages might occur.

In order to simplify the assembly, the invention also provides that the molded pieces are designed to be widening at their free ends of the webs for formation of a contact face for the adhesive ribbon.

In accordance with another embodiment of the invention, the process of preparing the cable sleeve further includes the steps of winding a ribbon of hot melt adhesive around the portions containing the cross-shaped devices. The ribbon is then briefly heated and pressed onto the cables and the outer edges of the devices until they adhere thereto. Subsequently, the hose is placed over the cable ends and is heated at a portion which has no inside hot melt adhesive coating in order to fix the hose in position. Thereafter, additional heat is applied to effect melting of the adhesives. This process results in a simplification of the assembly, with the advantages already named above.

The invention is described in the following with particularity with the help of the drawing.

BRIEF DESCRIPTION OF THE DRAWINGS

In the drawing:

FIG. 1 is an exploded presentation of a cable sleeve according to the invention in perspective, FIG. 2 is the same presentation of a cable sleeve in a modified embodiment example, FIG. 3 shows the final state after shrinking-on of the cable jacket according to FIG. 1 or FIG. 2, FIG. 4 is a perspective illustration of a cable sleeve of changed design partially in section; and FIG. 5 is a magnified section illustration of the area of entry of four cable ends.

DETAILED DESCRIPTION OF THE INVENTION

A cable sleeve designated generally with 1 in the figures is formed out of a hose 2 from shrinkable material, which, for instance can be provided with one single cable outlet 3. For the rest of it the cable sleeve is of usual construction, so that an enumeration of the details is dispensed with here.

Four cable ends 5 are introduced into the end 4 of the cable sleeve 1 opposed to the cable outlet 3, which cable ends are spliced in the inside, which is not important here. The device 6 according to the invention is presented in exploded fashion in front of these cable ends 5 in FIG. 1, which is designed as a molded member cross-shaped in cross-section and consists exclusively of a hot melt adhesive. The hose 2 is provided with a hot melt adhesive coating 7 on its inside. It is essential for the invention that the fusion or softening point of the hot melt adhesive coating 7 is higher than that of the hot melt adhesive of which the device 6 is formed.

All the same parts are designated with the same reference number in FIG. 2. Two devices 6 and 6a are illustrated there in recognizable manner, which have a longitudinal extent of "x" and are insertable into the device with a spacing "y". This spacing "y" of the device 6 or 6a with respect to each other should amount to 0.5- to 2-times the length "x" of the device.

The installed condition is shown in FIG. 3, meaning because of the special design of the device 6 or 6a all the cavities designated with 7 or 8 between the cables are filled with hot melt adhesive, so that the end face 4 is tightly sealed with respect to the inside of the sleeve 1.

The installation procedure of a sleeve 1 according to the invention is essentially as follows:

To start off with the sleeve is fabricated in the usual manner, i.e., the cable designated with 9 in FIG. 3 is appropriately reduced, the cable conductors are connected in the usual manner with equally reduced cable conductors of the cables 5 or other manipulations are accomplished at the cable ends, which is not important here. The sleeve is surrounded by a shrink-on hose 2, which is equipped on its inside with an adhesive coating 7 at least in the areas of its edges 3 and 4. In order to hold the cables 5 during assembly as well as also later in the sleeve at a distance from each other, the device 6 with its cross-shaped design is slid in between the inner spaces. After this had been done, the device 6 is maintained in its place by a short shrinking-on process of the hose 2 onto the outer edges of the device 6. Other auxiliary resources are not required for this. Therefore the webs of the device designated with 10 are appropriately of such a length that they are gripped at their upper edges by a slight shrinking-on process of the hose 2.

Subsequently heat is applied, until the melting temperature of the hot melt adhesive coating 7 is exceeded. The hot melt adhesive of the coating 7 now enters the cavities between the cable ends 5 and is pressed in direction of the end faces 4 or 3 of the sleeve 1 by means of a shrinking movement.

The device 6 now prevents the largest portion of the hot melt adhesive from exiting out of the sleeve ends for the time being and the hot melt adhesive is pressed into the cavities in a particularly efficient manner. By further application of heat and thus by the heat of the hot melt adhesive 7 itself, the device 6 is also melted, so that the end faces are completely filled with hot melt adhesive, which is designated in FIG. 3 with 7 and 8.

In the FIGS. 4 and 5 a modified embodiment example is presented. As far as it is possible, the same designation numerals as in FIGS. 1 and 3 have been inserted into those figures.

A cable sleeve generally designated with 1 in FIG. 4 is formed from an enveloping hose 5 from shrinkable material. At one end an individual cable 3a exits from the cable sleeve 1.

Four cable ends 5 are introduced in the illustrated example into the end 4 of the cable sleeve 1 opposed to the individual cable sleeve 3a, which are spliced with each other in the inside, which is not important here. In between these four cable ends 5 two molded pieces or devices 6 and 6a designed to be cross-shaped in cross-section and consisting of hot melt adhesive are introduced in the illustrated example. In this area the cable ends 5 are wound with a ribbon 11, also of hot melt material.

As is also discernible from FIG. 4, the enveloping hose 2 exhibits hot melt adhesive coating 7 at its edges so that the central area 12 is kept free of this hot adhesive coating.

The melting characteristics hereby are chosen to be such that the ribbon 11 has a lower fusion point than the molded pieces 6 or 6a as well as the hot melt adhesive coating 7.

It is discernible from FIG. 5, that the free ends of the webs 10 of the molded pieces 6 or 6a are designed to widen towards the outside. This area has been given the designation numeral 13 and constitutes a contact face for the ribbon 11 from hot melt adhesive material.

During assembly the ribbon 11 is wound on and slightly heated after insertion of the molded pieces 6 and 6a, so that it assumes a slightly pasty state and can be pressed by hand against the outer surfaces of the cable ends 5 as well as also to the molded pieces 6 and 6a particularly at their free ends 13 and adheres there. Subsequently the enveloping hose 2 is brought into position and shrunk on with its central area 12, so that it adheres to the splice. Subsequently additional heat is applied.

Naturally the embodiment examples of the invention which have been described can be changed in many ways, without abandoning the basic thought. Thus the invention is particularly not limited to the demonstrated specific design of the device 6, in particular its cross-sectional shape. It is possible to utilize other slightly deviating shapes, in particular if other quantities of cable ends 5 are inserted.

We claim:

1. A cable sleeve for covering a cable splice formed by cables having ends, comprising an enveloping hose of heat shrinkable material, a hot melt adhesive coating covering at least some portions of the inside surface of the hose, and at least one device cross-shaped in cross-section for insertion between and support of cable ends to be entered into the cable sleeve wherein the device is a molded piece of hot melt adhesive and wherein the fusion point of the hot melt adhesive of the device is below the fusion point of the hot melt adhesive of the coating.

2. A cable sleeve according to claim 1, comprising at least one additional device cross-shaped in cross-section to be inserted between cable ends and spaced in longitudinal direction of the cables apart from the device.

3. A cable sleeve according to claim 2, wherein the distance between the two devices is smaller than the length of each device.

4. A cable sleeve according to claim 2, wherein the distance between the two devices is smaller than half the length of each device.

5. A cable sleeve according to claim 1, comprising a ribbon of hot melt adhesive for surrounding cables and at least two devices for insertion between the cables and located underneath the enveloping hose, wherein the fusion point of the hot melt adhesive of the ribbon is lower than the fusion points of the hot melt adhesives of the devices and of the coating.

6. A cable sleeve according to claim 5, wherein the central area of the enveloping hose is free of hot melt adhesive coating.

7. A cable sleeve according to claims 5 or 6, wherein the outwardly facing edge portions of the cross-shaped devices are of increased thickness, the outer edges forming a contact surface for the ribbon.

8. A process for covering a cable splice formed by cables having ends, comprising the steps of inserting a cross-shaped device of hot melt adhesive between cable ends to be spliced, placing an enveloping hose having an inside coating of hot melt adhesive over the cable ends, and fixing the device in position by applying heat to the hose, wherein the fusion point of the hot melt adhesive of the device is lower than the fusion point of the material of the inside coating of the hose, applying further heat until the fusion point of the hot melt adhesive of the coating is exceeded so that the hot melt adhesive of the coating fills the cavities existing between the cables and the hot melt adhesive of the coating is prevented by the device from exiting out from between the cables at the end of the hose.

9. A process according to claim 8, comprising winding a ribbon of hot melt adhesive material onto the cables prior to mounting the hose, slightly heating the ribbon for a short period and pressing the ribbon onto portions of the cable surfaces and the outer edges of the devices so as to adhere thereto, sliding the enveloping hose over the ribbon, wherein the enveloping hose has inside coatings of hot melt adhesive material at the ends thereof so as to form a middle portion without hot melt adhesive coating, and heating the middle portion of the hose so as to shrink the hose onto the ribbon, and applying further heat in order to melt the hot melt adhesives of the ribbon and of the coating of the enveloping hose.

* * * * *